(12) United States Patent
Perlmutter

(10) Patent No.: US 8,315,374 B2
(45) Date of Patent: Nov. 20, 2012

(54) CUSTOMER-CONTROLLED RECORDING

(75) Inventor: S. Michael Perlmutter, San Francsico, CA (US)

(73) Assignee: Genesys Telecommunications Laboratories, Inc., Daly City, CA (US)

(*) Notice: Subject to any disclaimer, the term of this patent is extended or adjusted under 35 U.S.C. 154(b) by 641 days.

(21) Appl. No.: 12/480,023

(22) Filed: Jun. 8, 2009

(65) Prior Publication Data

US 2010/0310056 A1    Dec. 9, 2010

(51) Int. Cl.
*H04M 3/00*    (2006.01)

(52) U.S. Cl. .......................... 379/266.1; 379/85

(58) Field of Classification Search ............. 379/265.03, 379/265.06, 266.1
See application file for complete search history.

(56) References Cited

U.S. PATENT DOCUMENTS

| | | | |
|---|---|---|---|
| 7,203,285 B2 * | 4/2007 | Blair | 379/32.01 |
| 7,728,870 B2 * | 6/2010 | Rudnik et al. | 348/143 |
| 2002/0071529 A1 | 6/2002 | Nelkenbaum | |
| 2003/0069804 A1 * | 4/2003 | Barry et al. | 705/26 |
| 2005/0129216 A1 | 6/2005 | Tsujiuchi | |
| 2008/0093533 A1 * | 4/2008 | Onodera | 250/208.1 |
| 2008/0232575 A1 * | 9/2008 | Gumbula | 379/265.11 |
| 2009/0103711 A1 * | 4/2009 | Conway et al. | 379/266.01 |
| 2009/0207979 A1 * | 8/2009 | Russell | 379/85 |
| 2010/0020156 A1 * | 1/2010 | Berler et al. | 348/14.09 |
| 2010/0158204 A1 * | 6/2010 | Diskin et al. | 379/85 |
| 2010/0310056 A1 * | 12/2010 | Perlmutter | 379/85 |
| 2011/0213860 A1 * | 9/2011 | Ezerzer et al. | 709/218 |

\* cited by examiner

*Primary Examiner* — Creighton Smith

(74) *Attorney, Agent, or Firm* — Christie, Parker & Hale, LLP

(57) ABSTRACT

A recording system has an interface enabled to monitor interaction between an agent of an enterprise and a second person, recording apparatus enabled to record the interaction and to store the recording in a data repository, and software stored in and executing from a machine-readable medium, the software providing functions for controlling the recording apparatus. The software responds to inputs from the second person to control the recording apparatus.

15 Claims, 6 Drawing Sheets

CUSTOMER-CONTROLLED RECORDING

CROSS-REFERENCE TO RELATED APPLICATIONS

NA

BACKGROUND OF THE INVENTION

1. Field of the Invention

The present invention is in the field of telephony communications and pertains more particularly to contact center operations.

2. Discussion of the State of the Art

In the field of telephony communications, including Internet Protocol Network Telephony (IPNT), and Data Network Telephony (DNT), it is known for a contact center telephony system to record voice calls to monitor quality of service afforded to customers of the call center.

A customer calling the call center, in most situations, will receive an automated prompt that says something like "This call may be recorded for quality management purposes". In the call center it is probable that not all calls are in fact recorded for quality management purposes. Some calls may be selected randomly for recording, and some calls are not recorded at all. All voice calls may be recorded in some state-of-the-art contact centers for historical purposes. Such call recordings may be stored or archived for later retrieval by authorized call center personnel using a search tool.

It has occurred to the inventor that a customer engaged in ongoing dialog with a contact center may desire, and have need for access to what was said in voice conversation between the customer and an agent of the center. One benefit of such a capability might be that the customer feels assured that he or she has been heard correctly and that there is no verbal confusion relative to any transaction that may have occurred. However, current means for recording and archiving voice conversations between a contact center and customers do not include any functionality for customer control, either access to or recording of voice interaction.

Therefore, what is clearly needed is a system and methods for enabling customer control of recorded voice conversations between the customer and a contact center and at least some customer control over post-recording management tasks.

SUMMARY OF THE INVENTION

The problem stated above is that it would be desirable to enable customers to control how their calls or other interactions into a communication center are recorded however, current means for recording and archiving interactions between a contact center and customers do not include any functionality for customer control of the recording process.

The inventors therefore considered functional elements of a contact center environment looking for elements that exhibit seamless integration potential that could potentially be harnessed to provide customer control over the recording process, but in a manner that would not create impedance to the servicing process.

Every contact center is driven by incoming customer requests for interaction and the capability of agents working within the center to handle those interactions successfully. Most contact centers employ various customer access points including telephone, Web interaction, messaging, and computer telephony access. Call switches, routers, servers, interactive voice response systems, message routing systems and the like are typically a part of such contact center apparatus.

The present inventor realized in an inventive moment that if, at the point of an interaction, a customer could be empowered to control recording of the interaction, significant customer satisfaction might result. The inventor therefore constructed a recording and post-recording management system that allows customers of the center to pre-configure recording and post-recording management options and to control the recording process at the time of the interaction, in some cases overriding pre-configured settings. A significant increase in customer loyalty and trust results with no significant impediment on call flow through the contact center.

Accordingly, in one embodiment of the present invention a recording system is provided, comprising an interface enabled to monitor interaction between an agent of an enterprise and a second person, recording apparatus enabled to record the interaction and to store the recording in a data repository, and software stored in and executing from a machine-readable medium, the software providing functions for controlling the recording apparatus. The software responds to inputs from the second person to control the recording apparatus.

In one embodiment the second person has access to command input to cause the recording system to record all or a portion of the interaction under a circumstance that the interaction is not being recorded at the time of the record command input. In another embodiment the recorded interaction is marked as to the date and time of the interaction. In still another, the recorded interaction is further marked as to one or both of the participants in the interaction.

In one embodiment the second person has access to command input to cause the recording system to identify all or a portion of the interaction under the circumstance that the interaction is being recorded at the time of the command input. In one embodiment the identified portion of the recorded interaction is marked as to the date and time of the interaction. In some cases the identified portion of the recorded interaction is further marked as to one or both of the participants in the interaction.

In some embodiments the identified portion of the recorded interaction is copied and saved as a separate file, marked as to the date and time of the interaction. The separate file may be marked as to one or both participants in the interaction. The second person may have access to command input to retrieve and play the recorded interaction. Further, the second person may have access to command input to retrieve a copy of the recorded interaction, and may have access to command input to retrieve the identity, date and time of the portion of the recording identified.

In another aspect of the invention a method for recording control is provided, comprising the steps of (a) monitoring interaction between an agent of an enterprise and a second person engaged in the interaction; and (b) providing, to the second person engaged in the interaction, access to recording control functions.

In one embodiment, in step (b), the second person exercises command input to cause a recording system to record all or a portion of the interaction under a circumstance that the interaction is not being recorded at the time of the command input. There may be a step for marking the recorded interaction as to the date and time, and as to one or both of the participants in the interaction. Also in one embodiment the second person exercises command input to cause the recording system to identify all or a portion of the interaction under the circumstance that the interaction is being recorded at the time of the command input. There may also be a step for marking the identified portion of the recorded interaction as to the date and time of the interaction.

In one embodiment there may be a step for further marking the identified portion of the recorded interaction as to one or both of the participants in the interaction. There may also be a step for copying and saving the identified portion of the recorded interaction as a separate file, marked as to the date and time of the interaction. Further, there may be a step for marking the separate file as to one or both participants in the interaction, and a step for the second person, through command input, to retrieve and play the file. There may additionally be steps for the second person to retrieve a copy of the file, or for the second person to retrieve the identity, date and time of the portion of the recording identified.

BRIEF DESCRIPTION OF THE DRAWING FIGURES

DETAILED DESCRIPTION

The inventors provide a system and methods for enabling customers of a call center, or any party on a call with an agent of an enterprise, to control various aspects of call monitoring and recording of their calls. The system also enables customers to have access to recordings, or at least to information about the recordings, such as date and time, based on the preferences of the accessing customer. The present invention is described in enabling detail in examples presented below which may represent more than one embodiment of the present invention.

Figure 1:
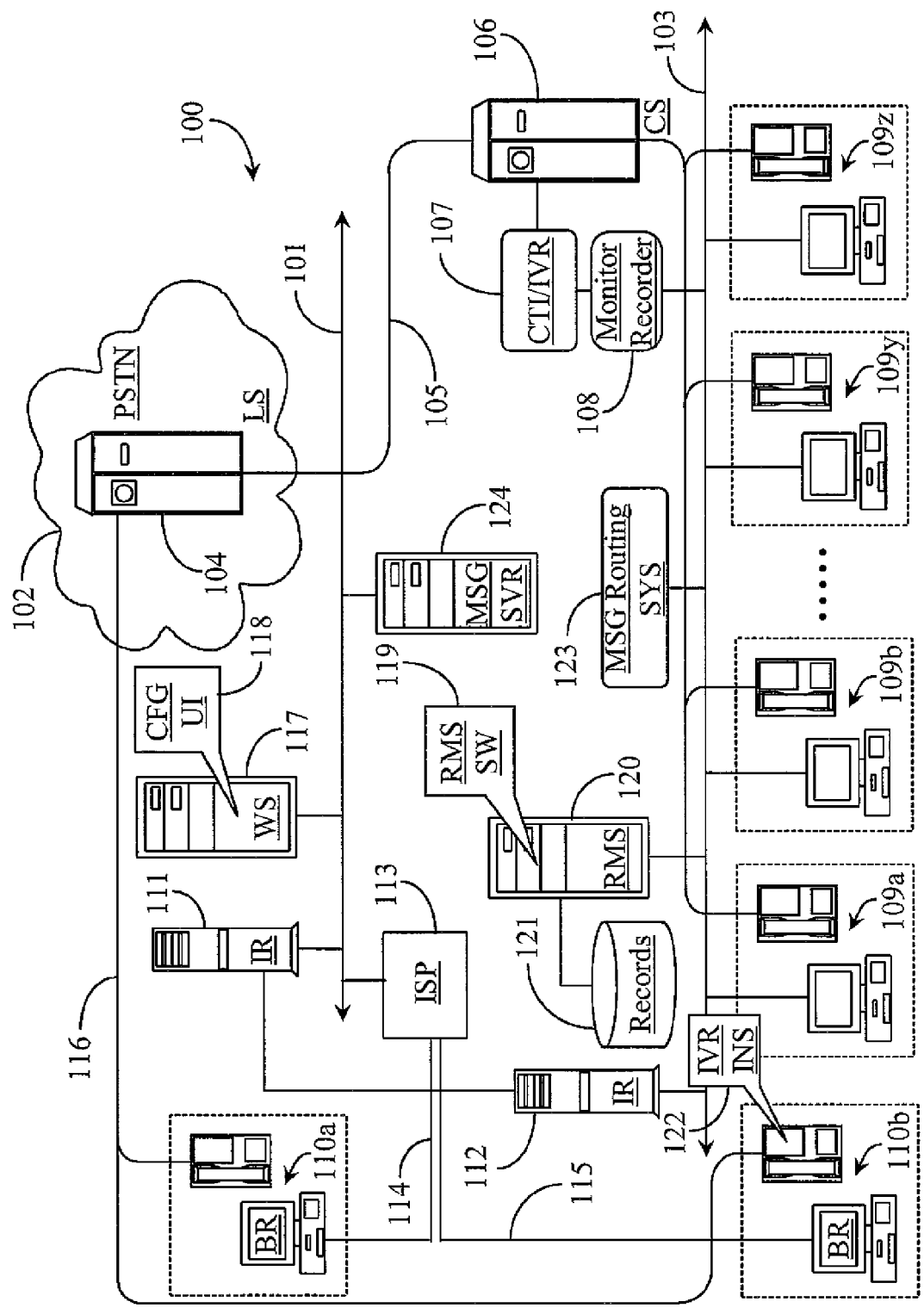
FIG. 1 is an architectural overview of a contact center practicing customer-controlled call recording according to an embodiment of the present invention.

FIG. 1 is an architectural overview of a contact center practicing customer-controlled call recording according to an embodiment of the present invention, as an example of the invention. A communications network 100 is illustrated in this example and represents a contact center and connected communication networks. A contact center is represented logically herein by a local area network (LAN) and supported workstations and various servers and routing equipment. LAN 103 has access to the Internet network represented in this example by an Internet backbone 101. Internet backbone 101 represents all of the lines, equipment, and access points that make up the Internet network as a whole including any connected sub-networks. Therefore, there are no geographic limitations to practicing the present invention.

LAN 103 is connected to Internet 101 via an Internet router (IR) 112 connected to LAN 103, which in turn is connected via an Internet access line to an Internet router 111 connected to backbone 101. IRs 112 and 111 are logically illustrated and may include other nodes within the path between LAN 103 and backbone 101 such as one or more connection servers or access nodes provided by an Internet Service Provider (ISP) for example. In a preferred embodiment LAN 103 is connected to Internet 101 on a continuous basis using high-speed Internet access technology.

A public switched telephone network (PSTN) 102 is illustrated in this example and represents a publicly accessible telephony network. PSTN 102 may include sub-networks such as wireless carrier networks without departing from the spirit and scope of the present invention. Internet 101 may be assumed to include wireless sub-networks as well such as wireless fidelity (WiFi) access networks. The inventor intends that representation of LAN 103, Internet 101, and PSTN 102 be viewed as exemplary only of a combination of existing networks that may enable practice of the present invention. PSTN 102 and Internet 101 are preferred in this example because of public accessibility however private networks may also be included as qualified sub-networks over which the present invention may be practiced.

LAN 103 is within the domain of a contact center and supports various nodes associated with a contact center. LAN 103 supports a number of agent workstations 109a through 109z. Individual agent stations illustrated include a LAN-connected computer and a telephone represented by an icon. Each agent computer has a graphic user interface (GUI) adapted for facilitation of call center business and communication. Agent telephones are connected by internal telephone wiring to a central office switch (CS) 106 within the domain of the contact center.

Agent computers in workstations 109a through 109z may be desktop or laptop computing devices. Other computing devices may also be present in an agent's workstation like a personal digital assistant (PDA) or a cellular device capable of LAN and Internet access. Agent telephones may be connection-oriented-switched-telephones (COST), private branch exchange (PBX) telephones, or telephony applications hosted on associated LAN connected computers within each workstation. CS 106 may be a PBX switch or an automated call distributor (ACD) or a "soft" telephony switch implemented in software without departing from the spirit and scope of the present invention.

CS 106 is computer telephony integrated (CTI) via a CTI processor 107 connected thereto by a CTI link. CTI processor 107 supports an interactive voice response (IVR) system that serves as first contact point for incoming calls at switch 106. Intelligent agent level routing is provided through CTI interface 107 controlling CS 106. CTI processor 106 is connected to LAN 103. CS 106 is connected to a local telephone switch (LS) 104 within PSTN 102 via telephony trunk 105. One skilled in the art of network integration will confirm that calls destined for the contact center (CS 106) may be sourced from landline telephone, cellular telephone, or computer telephony application or dedicated Internet Protocol (IP) telephone practicing voice over Internet protocol (VoIP). One or more gateways providing seamless integration between the networks may be assumed present in this example although none are specifically illustrated for bridging communication between PSTN 102 and Internet 101.

A call monitor and recorder 108 are provided in this example and may be implemented as a dedicated node connected to CTI processor 108 and to LAN 103. In one embodiment call monitoring and recording is implemented as a software application running on CTI processor 107. The inventor illustrates call monitor/recorder 108 separately from CTI processor 107 in order to logically isolate the functionality for discussion purposes. Monitor/Recorder 108 is adapted to monitor voice interactions in progress between agents and calling or called parties and to digitally record the voice interactions according to aspects of the present invention, which may enable specific customer controls over the process.

LAN 103 in this example supports a recording management server (RMS) 120 running an instance of RMS software (SW) 119. RMS 120 has a digital medium accessible thereto and a processor for storing and executing software applications adapted to manage recordings of voice interactions made by monitor/recorder 108. A mass data repository 121 is provided and is connected to RMS 121. Repository 121 is adapted to store recordings of calls and other historical records associated with the process. In one embodiment all interactions, or a preprogrammed portion of interactions connected to an agent through CS 106 may be monitored and recorded. In this embodiment customers may have control over which recordings or portions thereof are to be identified and possibly made accessible to the customer. "Access to the customer" may mean that the customer may retrieve data for locating the portion of a recording, may retrieve a copy of the recording, may be able to play the recording through contact center equipment, and many other variations. In a circumstance where interactions are being recorded whether or not the customer requests recording, a bookmarking system may be made available to mark the boundaries of a portion of the recording the customer desires access to, or may want to refer to, at some later date. In one embodiment a third-party company may provide the recording services but may not provide direct access to recordings. In another embodiment all calls connected to an agent through CS 106 may be monitored but not necessarily recorded, unless specified through customer instruction based on template pre-configuration or on real-time input made by the customer during the progress of the call. In some embodiments customers may use a web interface hosted by the enterprise to access recordings, portions of recordings, or even to download copies of recordings. There are many variations possible.

To be clear, the customer-provided functions of starting and stopping recording, may actually start and stop recording, may provide bookmarking to recording already in progress, or may start and stop a completely separate and parallel recording to be stored in the same or another repository.

In the present example a customer station 110a and a customer station 110b are illustrated. Customer stations 110a and 110b may be home domains, mobile access points, or other stations through which a customer may make use of the present invention. Like agent workstations 109a through 109z, customer stations 110a and 110b typically include a computerized appliance capable of accessing the network, and may also comprise a telephone device.

Customer station 110a in this example has a computer enabled by a network browser (BR) that has access to Internet 101 via an Internet access line 114 and an Internet Service Provider (ISP) 113. Customer station 110b includes a computer enabled by a network browser (BR) that has access to Internet 101 via an Internet access line 115 and ISP 113. Computers 110a and 110b may be desktop or laptop computers, PDAs, smart phones or like Internet-capable computing devices having a graphics display and browser functionality.

Telephones within each customer station may be COST telephones connected to PSTN 102 via telephone trunk 116 to LS 104. Internet 101 further includes a messaging server (MSG/SVR) 124, which may be any type of messaging server supporting any of the existing message protocols like post office protocol (POP), simple message transfer protocol (SMTP), multipurpose Internet mail extensions (MIME), instant message access protocol (IMAP), short message service (SMS), multimedia message service (MMS), and others. MSG/SVR 124 logically represents any text and/or multimedia messaging server. LAN 103 supports a message (MSG) routing system (SYS) 123 for routing incoming messages to available agents operating workstations 109a through 109z.

Internet backbone 101 supports a Web server (WS) 117 having a digital medium accessible for storing and serving electronic information pages (Web pages) upon request. WS 117 may, in one embodiment, host a Web site created by the contact center for the purpose of enabling customers of the center access to recordings of their transactions, or information about such recordings, including telephone conversations or portions thereof that were recorded at the center. WS 117 hosts a configuration user interface (CFG UI) 118 provided thereto and executable thereon that is adapted to enable customers of the contact center to register and configure telephony monitoring and recording preferences and recording access parameters to recordings of the customers' conversations with agents of the center. In one embodiment of the invention any customer of the contact center may pre-register with the center as a customer and, using CFG UI 118, may set call monitoring and recording preferences as well as access preferences to recordings created from voice calls. In one embodiment the web service might be enabled to support access by mobile devices, including for example, playback of recordings or display of information about such recordings.

In one embodiment customers are enabled through IVR (107) and a voice application (not illustrated) to set call monitoring and recording preferences as well as access preferences to recordings and information about recordings created and stored for access by the system. IVR instruction (INS) 122 is illustrated in this example at the telephone of customer station 110b. In this case a UT enabling pre-configuration of call monitoring, recording and access preferences may not be required to practice the invention. In another embodiment CFG UI 118 is provided and no IVR-based pre-configuration is available. In yet another embodiment both Web-based and IVR-based options are available to customers of the contact center.

In one embodiment of the invention a customer, such as one operating from customer station 110b, places a call to a telephone number provided by the contact center, which may be what is known as a toll-free number (although some are not free). The call is then routed through LS 104 in PSTN 102 to CS 106 in the contact center for automatic call distribution (ACD) or agent level routing (ALR). CTI/IVR 107 may answer the call at switch 106 to determine the purpose of the call and to initiate routing of the call to an available agent operating from one of workstations 109a through 109z. Before routing the call to a live agent, the customer may be presented instructions 122 for selection as parameters for monitoring and recording the call. The instructions may include dual tone multi-frequency (DTMF) options for initiating and for stopping recording of the call, or voice recognition-enabled interaction with the customer. For example, star 4 (*4) may be used to start recording and star 6 (*6) may be used to stop recording. DTMF keys may be used in real time to record selected portions of a conversation or an entire voice interaction. It should be noted that customer's always have an option for recording conversations at their own premises, using their own equipment; but in embodiments of the present invention customer control interacts with call-center equipment and software, and the calls are stored at the center.

In the circumstance that a call is recorded by the enterprise as a matter of policy, even though the customer has not requested that a call be recorded, the commands may simply identify the recording and portions thereof that are pertinent, so the same information is available that would be available if no recording is made in the absence of customer input.

In one embodiment the IVR options include voice-recognized commands that a customer may speak during any part of the telephone call like "start recording" and "stop recording". In this case a call monitor with voice recognition software may monitor the call and initiate recording or identifying portions of a recording if the customer vocalizes the intent. A voice application may be provided that takes a customer through the entire process of registering to control how voice calls will be treated in the sense of pre-configured preferences, for example recording calls and saving them for access through a Web site for 30 days.

In one embodiment a call recorded by monitor/recorder 108 is transferred via LAN 103 to RMS 120 running RMS SW 119. The transfer may occur in near real time as the call is being recorded. RMS 120 stores the recording along with identification of the customer, time of call, perhaps purpose of the call, and perhaps other related information in repository 121. With the aid of RMS SW 119, RMS 120 may then publish the recording along with other information deemed appropriate to WS 117. A customer operating at customer station 110a may then access WS 117 using a browser (BR) installed on an Internet-capable appliance such as the illustrated computer. The customer may have a personalized Web page that provides download access to saved recordings taken from calls established between the customer and the center and perhaps other documented business engaged in by the customer with the contact center such as chat transcripts, email dialogs, active invoices, current order status, active purchase orders, and the like. In the circumstance of background recording of calls, the information sent to the web site may be the data about the call. In some embodiments the customer may be allowed to download voice recording, and in some other embodiments the customer may be limited to identities and data about recordings.

It shall be understood that the embodiments in this specification relating to voice communication as interactivity between an agent of an enterprise and another person who is not an agent of the enterprise, are indeed exemplary, and the systems and methods of the invention are not limited to voice communication as interactions. Interactions may also be chat sessions, text messaging and the like, rather than voice, and may in some circumstances involve both text and voice communication in a same interaction. In the case of voice interaction the recording apparatus will record the verbal exchange, which may also be converted to text. In the case of text communication the recording apparatus records the text activity of both participants in the interaction.

In one embodiment a customer may be provided with a version of a Web page that is adapted for cellular telephones such as by wireless application protocol WAP or more recent protocols. In this case a customer may be enabled to stop and to start recording, or marking an ongoing recording on a current call by sending a short message service (SMS) message that may be a pre-configured template with the command of "start recording" or "stop recording". In another embodiment a token might be used to signal the system to start recording or marking and a different token could be used to signal the system to stop recording or marking. In another embodiment parameters for monitoring and recording calls between the customer and the contact center can be established in rich presence information held and managed at the customer's accessing device. In this case a thin SW client may be provided to the customer device that enables the pre-configuration and reporting of the presence information and configured call recording and post-recording management options.

In one embodiment the system utilizes message routing system 123 to generate an automated outbound email or an multimedia messaging service (MMS) message to the customer, the message including one or more recordings formatted in MP3, WAV, MPEG, MOV, AVI, or other compression formats for audio and video. Video may be associated with an audio recording of a voice call in an embodiment where the voice conversation includes video streaming such as in a video phone conversation.

In one embodiment of the present invention all calls between customers and the center are recorded by default and retained for a period of time as part of the historical record of activity at the call center, but are not necessarily shared with the customers. In this case real time commands for initiating recording and stopping recording of conversations enable "capture" of all or portions of conversations that were already recorded.

In one embodiment a customer on a call and in a chat session or an IM session with a contact center simultaneously may control recording aspects of the call in progress from the chat or IM interface. In this example start and stop recording buttons and current state information (recording or not recording) of the call in progress may appear in the interface for the customer to use.

Figure 2:
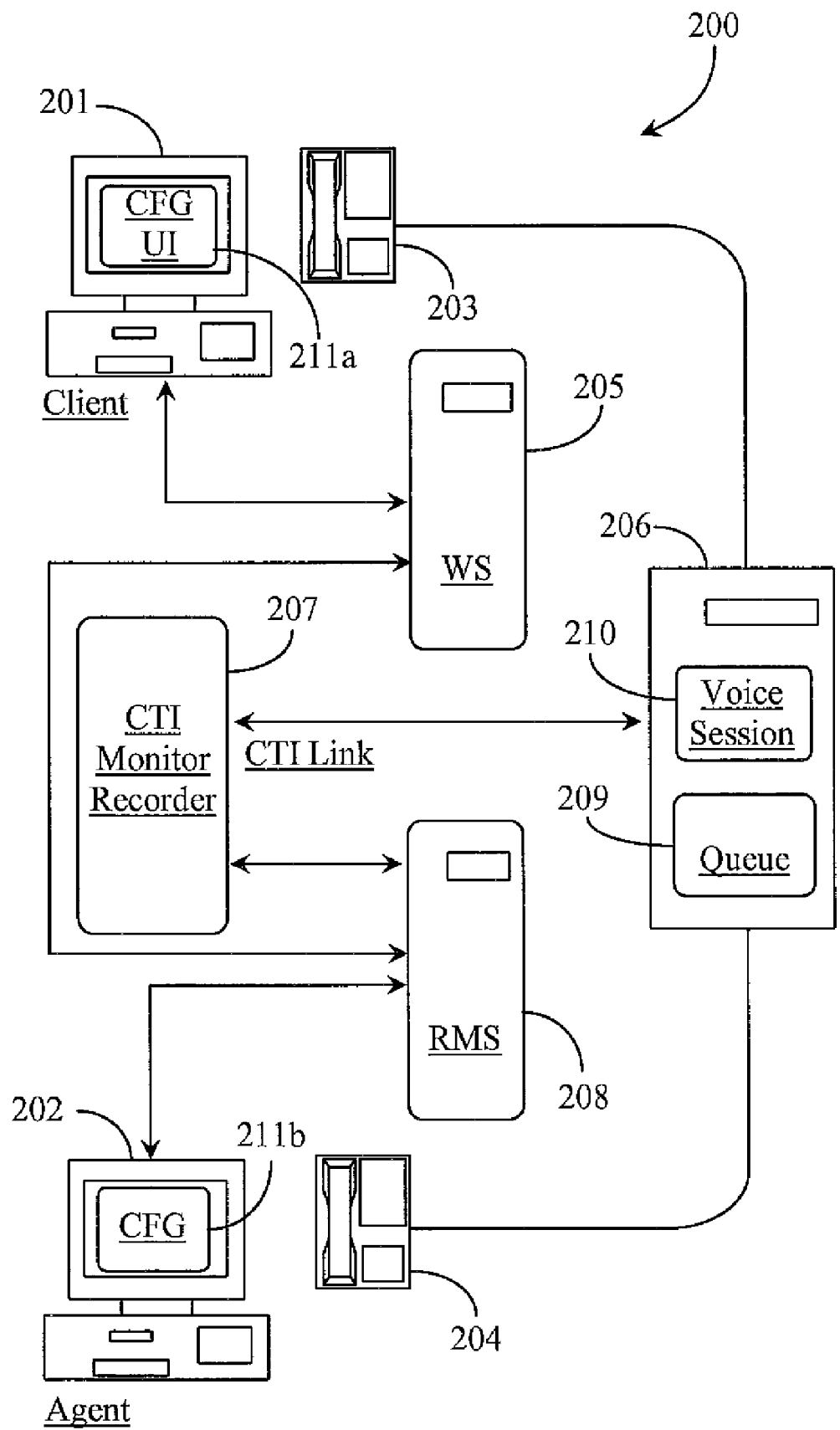
FIG. 2 is a logical overview of system architecture for recording calls and publishing recordings according to an embodiment of the present invention.

FIG. 2 is a logical overview of system architecture 200 for recording calls and publishing recordings according to an embodiment of the present invention. System architecture 200 includes a call center switch 206 that may be analogous to CS 106 described in FIG. 1. Switch 206 shows an active call queue 209 and an active voice session 210 in progress and being monitored.

A customer computer 201 is illustrated having Web access to a Web server (WS) 205. WS 205 serves a configuration UI (CFG UI) 211a illustrated in state of display on the GUI of computer 201. Computer 201 may be analogous to a computing device illustrated in customer station 110a or 110b and WS 205 may be analogous to WS 117 of FIG. 1. UI 211a may be analogous to UI 118 of FIG. 1. A customer telephone 203 has connection to switch 206 and the customer is engaged currently in session 210 with an agent represented herein by an agent telephone 204 connected to switch 206. The customer's equipment may alternatively be any sort of computerized alliance capable of supporting the needed protocols and interaction.

A recording management server (RMS) 208 is illustrated in this example and may be analogous to RMS 120 described in FIG. 1. An agent computer 202 has a LAN connection to RMS 208. RMS 208 has a LAN connection to CTI monitor/recorder, which in turn is connected to switch 206 via a CTI link. The agent computer may be analogous to any of the computers associated with workstations 109a through 109z and agent telephone 204 may be analogous to any of the telephones associated with those workstations described in FIG. 1 above.

In one embodiment of the present invention the customer that is operating from computing device 201 logs into WS 205 and registers for call-control including configuring call management preferences using CFG UI 211a. WS 205 mirrors the configuration parameters of the customer to RMS 208 where it is stored for later access. The agent operating from computing device 202 accepts the customer call using telephone 204 and session 210 is established. Just before the agent takes the call during the ringing event at telephone 204 the configuration parameters CFG 211b of the customer are uploaded to the agent's computing device 202 by RMS 208. The interface including the configured parameters is pushed to the agent's computing device 202 by RMS 208. The correct configuration parameters are accessed from storage by RMS 208 based on call notification of the parties of session 210 before it is established but after final routing has been determined. In this way the agent may initiate recording of voice session 210 according to configured parameters.

The customer may have realtime control over recording or not recording voice session 210, or saving information about an ongoing recording at any time during the session by vocalizing the intent or using DTMF commands from telephone 203. The agent may initially establish default settings for monitoring and recording session 210 in compliance with the configuration interface 211b of the customer with the customer able to override those settings with realtime commands input into the telephone. The commands are interpreted and executed directly by CTI monitor/recorder 207.

The customer may also have realtime control over recording or not recording session 210 via sending of one or more messages from computing device 201 connected to WS 205. A command to start recording in a message from the customer may be routed from WS 205 to CTI monitor/recorder 207 through RMS server 208. The agent in session 210 may receive notification of the status from RMS 208 as it is implemented. In one embodiment other aspects of recording management like posting recordings online can be handled manually by the agent in session according to parameters in CFG 211b.

To record session 210, or to mark and identify an ongoing recording the agent inputs the command into the interface providing the customer-configured parameters in CFG (211b) at computing device 202. The command is uploaded to RMS 208 and routed to CTI monitor/recorder 207, which initiates the command at switch 206. The recorded session 210 is transferred to RMS 208 where it is stored. RMS 208 may publish or post the recording or information about a recording, or both to a Web site hosted on WS 205 where the customer may download it, listen to it online, or access data about the recording. In one embodiment the customer may manage all of the posted recordings such as by deleting them when no longer needed and so on. In one embodiment recordings may be uploaded automatically to any social network page the customer may subscribe to like Facebook™ or Myspace™. The invention may be practiced using an analog telephone interface or a digital telephone interface or application using VoIP and session initiation protocol (SIP) to set up the live sessions. In some embodiments the enterprise may save copies of recorded interactions for their own use, even though a customer may have requested the recording be deleted. In some embodiments authorization of both the customer and the enterprise may be necessary to delete a recording altogether.

Figure 3:
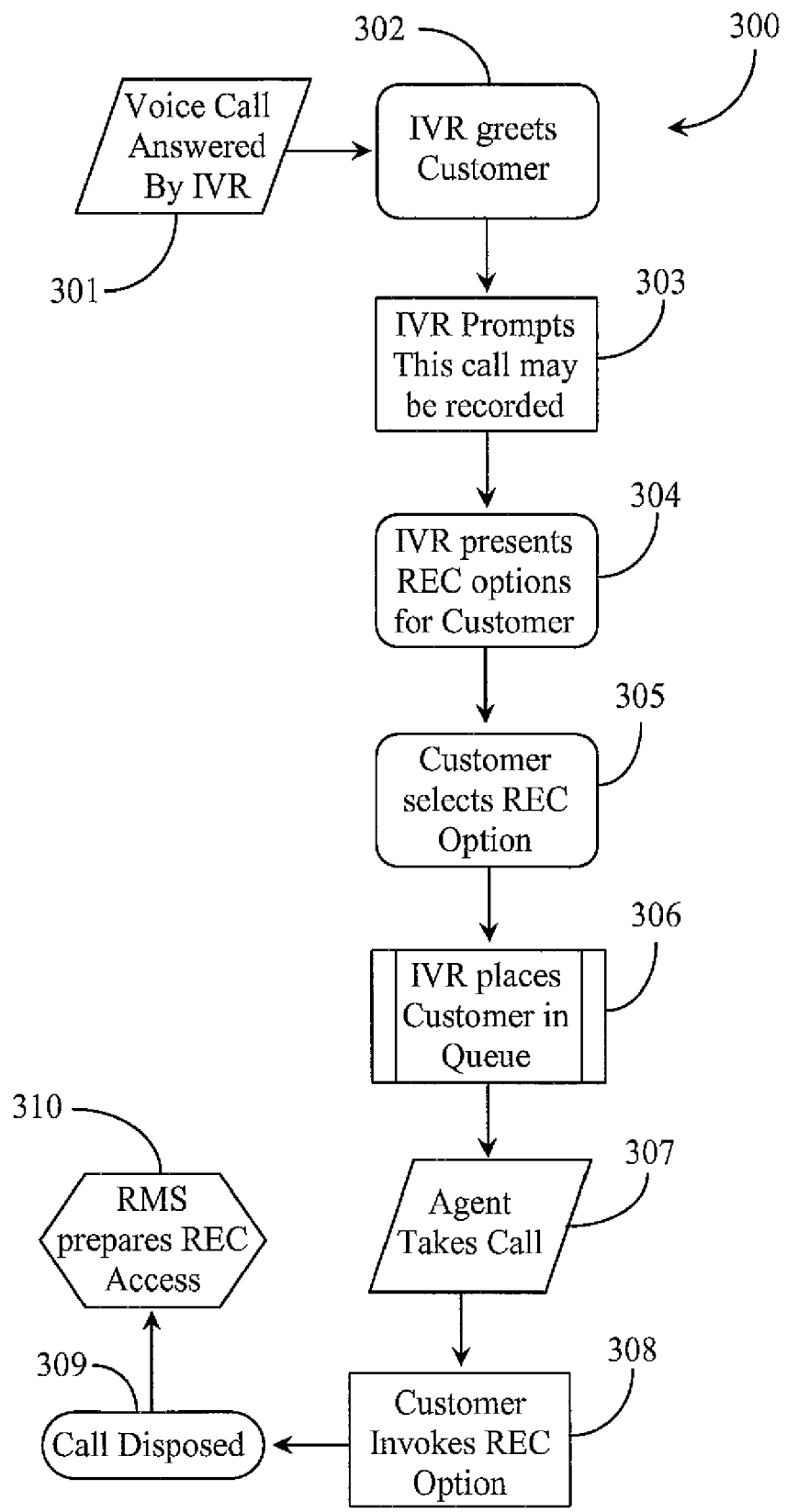
FIG. 3 is a process flow chart illustrating steps 300 for practicing an IVR-based customer-controlled call recording process.

FIG. 3 is a process flow chart illustrating steps 300 for practicing an IVR-based customer-controlled call recording process. This process inclusive of steps 300 focuses on an embodiment where an IVR provides the functionality of the invention to the customer. A voice call is answered by IVR at step 301. The IVR system plays a customer greeting at step 302. At step 302 the IVR unit may also identify the customer, determine the reason for the call, and request routing for the customer.

The IVR unit may inform the customer that the call may be monitored for quality assurance purposes at step 303. The IVR unit lists recording options for the customer before routing the call to a live agent or to a queue. The options may be presented in one or more prompts enabling the customer to select recording options at step 305. There may be a few or several different options selected by a customer for recording the session and for configuring recording management preferences. In this example the IVR unit places the customer in a queue at step 306 to be distributed to an available agent working the queue.

An agent takes the call at step 307. This step may be signaled by a ringing event at the agent's telephone, or may just be opened with or without alert to the agent. The customer may invoke a recording option presented as a command at step 304 to record or to stop recording, or to mark an ongoing recording. The customer in some embodiments may control how much of the session if not all of the session will be recorded or bookmarked. The call is disposed of at step 309. The RMS prepares the recording for publishing or posting to a Web site personalized to the customer at step 310. Preparation may include compressing the audio and video if recorded. The RMS may provide a title for the recording and may provide a short text summary of the content or subject matter of the recording. The recording may be listed with other recordings according to some priority scheme set up by the customer. It is noted herein that the present invention may be practiced to monitor and record incoming calls into the contact center and outbound calls placed to customers from the contact center without departing from the spirit and scope of the present invention.

In one embodiment the agent who interacted with the customer prepares the recording for posting according to customer preferences made available to the agent before the agent accepted the call. In one embodiment all of the post-recording management is automatic including posting recordings for download or sending recordings to customers. In one embodiment a customer may order a media version of one or more recorded conversations recorded at the contact center, such as CD, DVD, tape, flash, or other.

Figure 4:
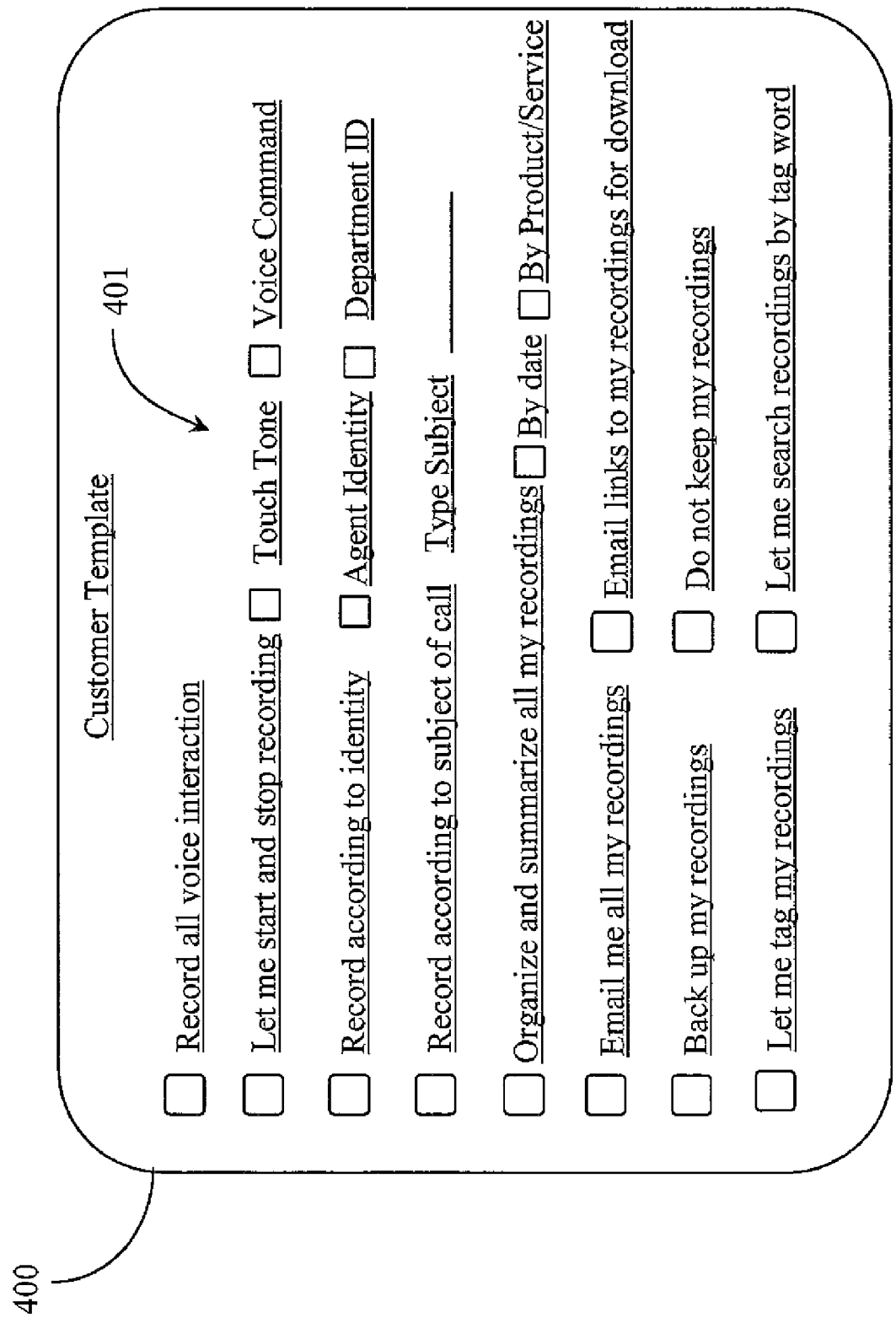
FIG. 4 is an exemplary screen view of a customer configuration template for configuring recording options.

FIG. 4 is an exemplary screen view of a customer configuration template 400 for configuring recording options. Customer configuration template 400 may be presented to customers accessing a Web site to register for call-control capabilities as part of a configuration UI like CFG UI 118 of FIG. 1. A customer may provide required identification such as address, telephone contact information, username and password for login purposes, and credit card information if required before being served customer template 400 for configuring call recording and management options 401.

Options 401 may include an option for recording all voice interactions between the customer and the center. If the customer selects the first option listed then all voice interactions are recorded by default. A next option enables initiation and termination of recording of a voice interaction in real time. Associated with this option are selections for using touch-tone commands to start and stop recording and a selection for using voice commands for starting and stopping recording. In one embodiment the system provides those touch-tone and voice commands. In another embodiment the customer may configure the touch-tone and voice commands that will be used.

A next option if selected enables the customer to record voice interaction based on identity. Associated with this option are selections for recording based on agent identity and a selection for recording based on department identity. If recording by agent identity is selected, a text window may appear for inputting one or more identities of agents working at the contact center. A list of agent names and/or numbers may be provided for the customer to check which agents the customer would like recorded if they handle a voice call for the customer. The identities entered may be names of agents or ID numbers of agents. If recording by department ID is selected then a window may appear for the customer to enter the department identification (name or number). A list of departments may be provided for the customer to select from.

If recording by agent identity any selected agent that takes a call from the customer will be recorded during that voice interaction. The customer may still exercise realtime control over recording overriding the pre-configured parameters. If recording by department ID all calls from the customer handled by a selected department are recorded regardless of agent identity. However, in one embodiment the customer may set recording options to record all calls between the customer and a specific department of the contact center with an exception of one or more identified agents working in that department. The reverse scenario is also possible, that is not to record conversations between the customer and a specific departing with the exception of one or more specific agents working within the department.

A next option for recording enables the customer to record interactions according to the subject of the call. A text entry field may be provided for the customer to type in one or more subjects that are subject to recording. For example, a subject might be a particular type product or service. A subject might be customer service or technical support. Every time a call from the customer is handled and the subject of the call relates significantly to a subject matter selected or entered into the system by the customer, the call is recorded.

Some of options 401 are relative to post-recording management services. A next option in this category is the option for organizing and summarizing all recordings. This option enables the customer to configure how the system will list recordings, for example, on a personalized Web page. Associated with this option are selections for organizing the recordings by date and one for categorizing recordings by product or service. A summary of a recording may include the subject of the call, and a short paragraph describing the content of the call. In one embodiment a customer may specify how long recordings should be kept. In one embodiment this can be managed by the customer by selecting a recording and selecting from a list of time periods for keeping the recording. A customer may be enabled to remove recordings from the presentation page and may in some cases delete them from the server if authorized.

Another option 401 directs the system to email recordings directly to a customers email address. In this case a recording may be emailed to the customer shortly after the recording was made in the contact center. An automated email may be generated and sent to the customer each time a recording is made.

Another option 401 allows the system to email download links for the recordings. In one embodiment a customer may order backup copies of recordings to be made and kept for safekeeping. Another option directs the system not to retain the recordings. In this case recordings may be sent to the customer but not kept at the contact center. One option 401 allows the customer to tag recordings saved for the customer. A related option enables the customer to search through recordings by applied tag word used as a search term. There may be other options presented in customer template 400 than are illustrated herein without departing from the spirit and scope of the present invention. Likewise, there may be fewer options available without departing from the spirit and scope of the present invention.

In one embodiment a customer may have options for carbon copy (CC) and blind carbon copy (BCC) mailing of recordings to designated recipients whose addresses are automatically included in the list of recipients who will receive the recording. In another embodiment recordings may be posted to a customer's personalized Web page for access and to other Web sites where the customer has a password protected personal page. There are many possibilities.

Figure 5:
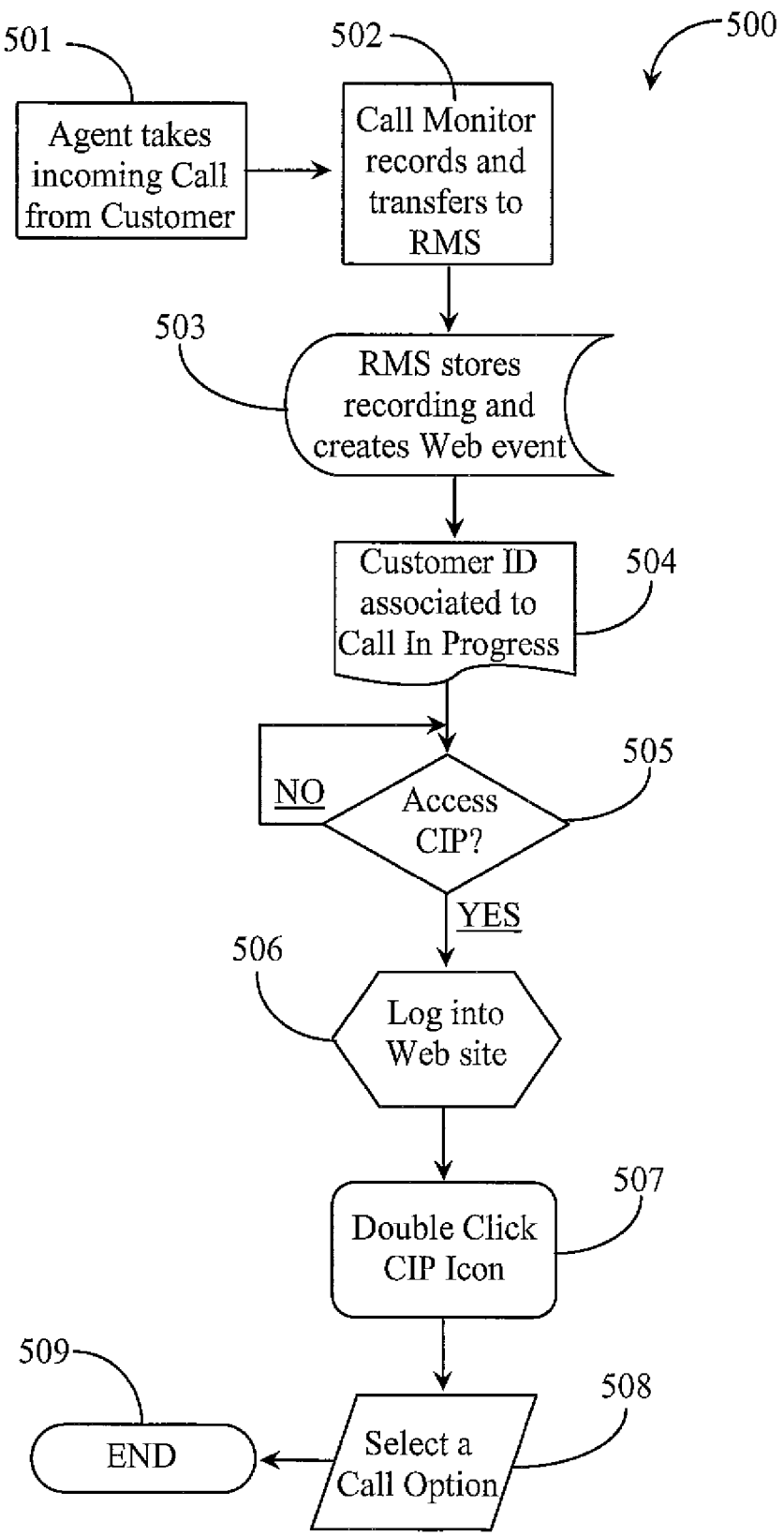
FIG. 5 is a process flow chart illustrating steps for practicing a Web-based customer-controlled call recording process.

FIG. 5 is a process flow chart illustrating steps 500 for practicing a Web-based customer-controlled call recording process. At step 501 an agent working for the contact center takes an incoming call from a customer. A call monitor/recorder analogous to call monitor/recorder 108 of FIG. 1 monitors the call at step 502 and records the call if ordered, or may be making an ongoing recording. The call monitor/recorder sends the recorded version in real time as it is being recorded to a recording management server (RMS) analogous to RMS 120 of FIG. 1. The RMS receives the call recording and stores the recording internally or in a connected repository on behalf of the customer at strep 503 and in addition, simultaneously creates a Web event of the call in progress associated with the recording. The RMS publishes the Web event at step 504 to the personal page of the customer that initiated the call. In this step customer identification is associated to the call in progress and the live Web event may identify the customer and the agent as well as the current duration, recording state, subject of the call and time and date of the call.

The live Web event representing the call in progress may be accessed by the customer and it may be manipulated to stop recording. In one embodiment if the call is monitored but not being recorded, a Web event may still be created representing the live, in-progress call.

The customer on the call may, in one embodiment, decide whether to access the live call at step 505. The live call is represented on the customer's Web site and in order to start or stop recording of the event, the customer logs into the site and can highlight the call in progress event displayed to control recording and post-recording management of the recording resulting from the call.

If at step 505 the customer decides not to access the represented call in progress, then the process may loop back until the decision is made to access the event. After the duration of the event representation of the event may be terminated at the Web site but any recording taken from the call represented is presented for listen or download by the customer.

If at step 505 the customer decides to access the call in progress (CIP) at step 506 the customer may log into the Web site hosting the representation of the live event. It is noted herein that there may be some slight delay before the representation of the live event becomes accessible on the Web site. Once at the Web site the customer can see the represented event in progress including customer and agent identification, recording state, department ID, and perhaps additional information associated with the event. Controls for starting and stopping recording may be present as radio buttons or icons associated with the event. The initial state of recording of the event depends on the default setting configured by the customer in the customer configuration template previously described before.

A customer may double-click an icon representing the CIP at step 507 to open up the possible options for realtime control over aspects of the event. Primary among these options is the ability to stop recording the call and the ability to start recording the call. At step 508 the customer may select a call option and implement that option. Step 508 may be repeated for each option selected. For example, a customer may select and implement the option record call for a CIP that is being monitored and represented as a Web event but that is not currently being recorded.

A customer may also select and implement an option that stops recording a CIP that is currently being monitored, represented on the Web-site in real time and that is currently being recorded. Other options that may override pre-configured call-control and post-recording management options may be provided for selection relative to the CIP representation on the Web site. Call-control options provided with the representation of the event on the Web site may be selected and implemented as long as the state of the represented event is live meaning that the call is in progress between the accessing customer and the agent. At step 509 the process ends when the CIP representation is terminated because the call is no longer connected.

Figure 6:
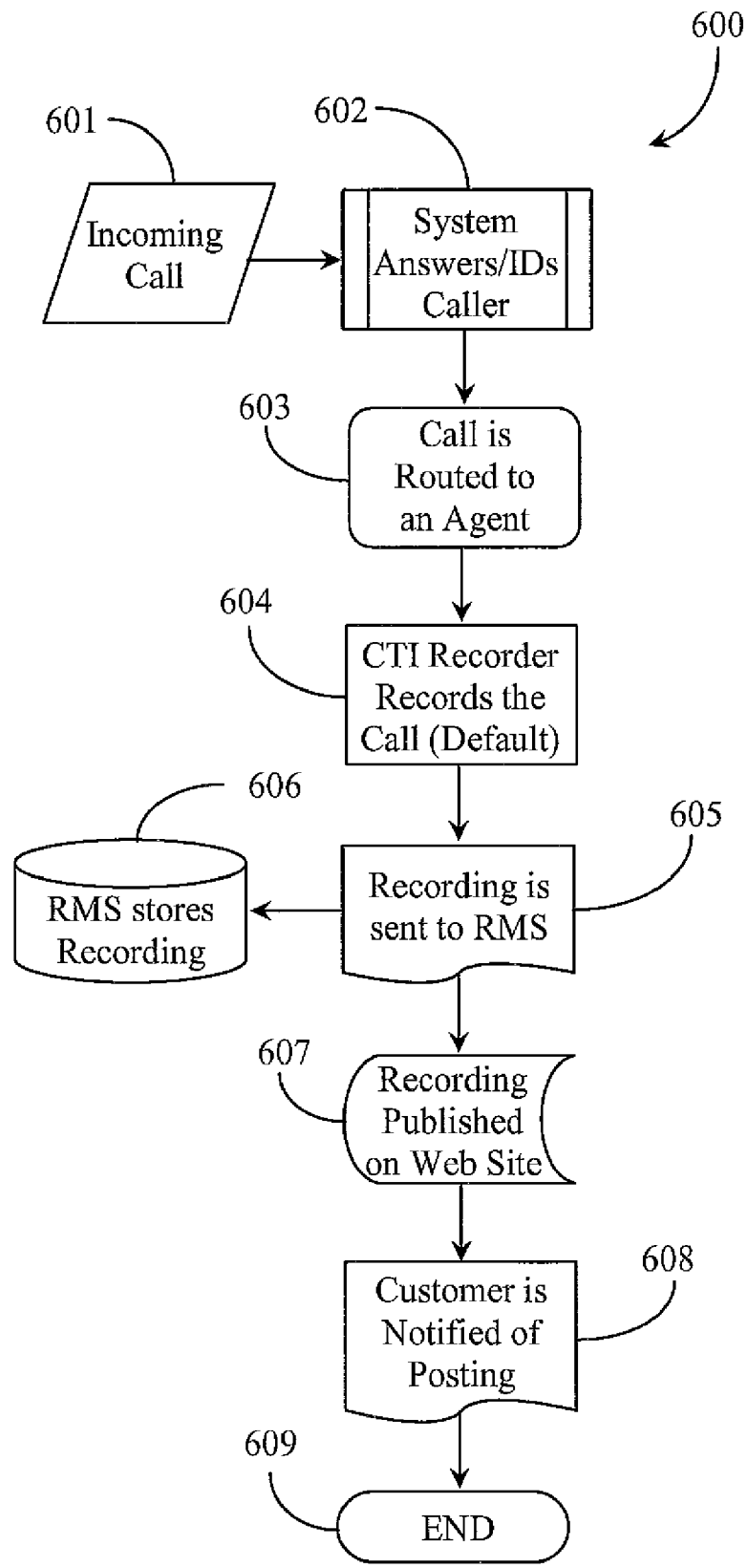
FIG. 6 is a process flow chart illustrating steps for publishing recorded calls according to an embodiment of the present invention.

FIG. 6 is a process flow chart illustrating steps 600 for publishing recorded calls according to an embodiment of the present invention. At step 601 the contact center receives an incoming call. In one embodiment the call received may be the result of an outbound contact made to a customer that is treated as an inbound call if answered by the customer. The system (IVR) answers the call and identifies the caller at step 6002. In this step the system may also greet the customer and determine the reason for the call if not already known to the system.

At step 603 routing is requested and the call is routed to a live agent. The CTI monitor/recorder monitors and records the call at step 604 when the agent picks up the call by default in this example. The recording of the call and additional identification and other data deemed relevant is sent to the recording management server (RMS) at step 605. This process occurs in near real time and the call in progress may or may not be simultaneously represented on a Web site accessible to the customer of the call.

At step 606 the RMS stores the recording and relevant information in a format for presentation to the customer. The customer may opt to listen to the recording online or to download and save the recording to a personal appliance for storage. At step 608 the customer can be notified by email, instant message, SMS or MMS that the recording has posted for download or listening. At step 609 the process ends for that customer. The customer may also be notified that the reference record has posted, but actual playback or download may not be made available to the customer.

The present invention may be practiced over the Internet network and connected telephony networks wired or wireless or a combination thereof without departing from the spirit and scope of the invention. The present invention may be practiced with a PBX system, a COST system or with VoIP systems or a combination thereof without departing from the spirit and scope of the present invention.

It will be apparent to one with skill in the art that the customer-controlled recording system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A recording system, comprising:
    an interface hosted by an enterprise enabled to monitor interaction between an agent of the enterprise and a customer placing a call to the enterprise;
    a recording apparatus enabled to record the interaction and to store the recording in a data repository; and
    software stored in and executing from a non-transitory machine-readable medium, the software providing functions for controlling the recording apparatus;
    wherein the software responds to inputs from the customer to control the recording apparatus causing the recording system to at least record the interaction, and identify all or a portion of the interaction being recorded, wherein the identified portion of the recorded interaction is copied and saved as a separate file, marked as to a date and time of the interaction and the recording is made available to the enterprise and the customer.

2. The system of claim 1 wherein the customer has access to command input to cause the recording system to record all or a portion of the interaction under a circumstance that the interaction is not being recorded.

3. The system of claim 2 wherein the recorded interaction is marked as to the date and time of the interaction.

4. The system of claim 3 wherein the recorded interaction is further marked as to one or both participants in the interaction.

5. The system of claim 1 wherein the identified portion of the recorded interaction is further marked as to one or both participants in the interaction.

6. The system of claim 1 wherein the separate file is marked as to one or both participants in the interaction.

7. The system of claim 2 wherein the customer has access to command input to retrieve and play the recorded interaction.

8. The system of claim 1 wherein the customer has access to command input to retrieve identity and the date and time of the portion of the recording identified.

9. A method for recording control, comprising the steps of:
    (a) monitoring interaction between an agent of an enterprise and a customer initiating the interaction;
    (b) providing, to the customer engaged in the interaction, access to recording control functions via an interface hosted by the enterprise;
    (c) executing recording of all or a part of the interaction by the customer;
    (d) identifying, via the customer interacting with the control functions, all or a portion of the interaction being recorded which is copied and saved as a separate file, marked as to a date and time of the interaction, wherein the separate file is made available to the enterprise and the customer.

10. The method of claim 9 including a step for marking the recorded interaction as to the date and time.

11. The method of claim 10 including a step for marking the recorded interaction as to one or both participants in the interaction.

12. The method of claim 9 including a step for further marking the identified portion of the recorded interaction as to one or both participants in the interaction.

13. The method of claim 9 including a step for marking the separate file as to one or both participants in the interaction.

14. The method of claim 9 including a step for the customer to retrieve a copy of the file.

15. The method of claim 9 including a step for the customer to retrieve identity and the date and time of the portion of the recording identified.

* * * * *